United States Patent
Choi

(10) Patent No.: US 9,409,481 B2
(45) Date of Patent: Aug. 9, 2016

(54) APPARATUS AND METHOD FOR DISPLAYING CLUSTER

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 283 days.

(21) Appl. No.: 14/144,267

(22) Filed: Dec. 30, 2013

(65) Prior Publication Data

US 2015/0109756 A1  Apr. 23, 2015

(30) Foreign Application Priority Data

Oct. 17, 2013 (KR) .................. 10-2013-0123947

(51) Int. Cl.
| | |
|---|---|
| B60Q 1/26 | (2006.01) |
| B60K 37/02 | (2006.01) |
| G01D 7/00 | (2006.01) |
| G01D 7/04 | (2006.01) |

(52) U.S. Cl.
CPC ................ B60K 37/02 (2013.01); G01D 7/002 (2013.01); G01D 7/005 (2013.01); G01D 7/04 (2013.01)

(58) Field of Classification Search
CPC ..... G01D 11/28; G01D 13/265; G01D 13/02; G01D 13/22; G01D 7/04; G01D 7/08; B60K 37/02; B60K 35/00; B60K 2350/408; B60K 2350/1064; B60K 2350/2008
USPC ....................... 362/23.21, 459, 489
See application file for complete search history.

(56) References Cited

U.S. PATENT DOCUMENTS

| | | | |
|---|---|---|---|
| 5,648,755 A | 7/1997 | Yagihashi | |
| 2006/0185576 A1 | 8/2006 | Tane | |
| 2009/0267753 A1 | 10/2009 | Kim | |
| 2010/0315218 A1* | 12/2010 | Cades | B60K 35/00 340/441 |
| 2011/0122049 A1* | 5/2011 | Lvovskiy | G02B 27/0101 345/1.3 |
| 2014/0182508 A1* | 7/2014 | Oishi | B60K 37/02 116/62.3 |

FOREIGN PATENT DOCUMENTS

| | | |
|---|---|---|
| JP | H07198425 A | 8/1995 |
| JP | 2005-181277 A | 7/2005 |
| JP | 2006267081 A | 10/2006 |
| JP | 2010-539586 | 12/2010 |
| KR | 10-2005-0019150 | 3/2005 |
| KR | 10-0911566 | 8/2009 |
| KR | 10-2012-0004139 | 1/2012 |

* cited by examiner

*Primary Examiner* — William Carter
(74) *Attorney, Agent, or Firm* — Mintz Levin Cohn Ferris Glovsky and Popeo, P.C.; Peter F. Corless

(57) ABSTRACT

An apparatus and a method for displaying a cluster are provided. The apparatus includes a driving sensor that senses a driving state of a mobile object and a display unit that converts a method of displaying a cluster indisposed within the mobile object. A controller is configured illuminate a scale and a pointer that indicates the scale based on the sensed driving state of the mobile object. In addition, the controller detects a current driving state of the mobile object in real time to generate a control signal with respect to the display method including a brightness degree, a brightness region, and a color of the scale.

15 Claims, 7 Drawing Sheets

APPARATUS AND METHOD FOR DISPLAYING CLUSTER

CROSS-REFERENCE TO RELATED APPLICATION

This application claims the benefit of priority to Korean Patent Application No.10-2013-0123947, filed on Oct. 17, 2013 in the Korean Intellectual Property Office, the disclosure of which is incorporated herein in its entirety by reference.

BACKGROUND

1. Field of the Invention

The present invention relates to an apparatus and a method for displaying a cluster, and more particularly to an apparatus for displaying a cluster to change an illumination color, illumination brightness, and an illumination range with respect to meters to provide information on a cluster disposed within a vehicle based on a driving state of the vehicle and a pointer that indicates a scale of the meters, and a method thereof.

2. Description of the Related Art

In general, meters such as an engine cooling water thermometer, a Tachometer, a speedometer, and a fuel amount gauge are disposed on a cluster that is mounted on an instrument panel of a vehicle. The meters include a scale that indicates respective metering values and a pointer that indicates the meter to transfer metering values to a driver.

Further, the illumination device is installed within the meter which enables a driver to clearly recognize a driving state of the vehicle at night. In addition, illumination devices of various meters within the cluster are operated simultaneously, and the various meters display a particular color based on a color of a cap or a fluorescent characteristic of a cap that covers an illumination device. However, according to the above related art, recognition capacity of the driver for a speedometer among meters may be degraded increasing the risk of excessive speed.

SUMMARY

The present invention provides an apparatus and a method for displaying a cluster to change an illumination color, illumination brightness, and an illumination range with respect to a meter to provide information on a cluster disposed within a vehicle and a pointer that indicates a scale of the meter based on a driving state of the vehicle.

In accordance with an aspect of the present invention, an apparatus for displaying a cluster may include: a driving sensor configured to sense a driving state of a mobile object; a display unit configured to convert a method of displaying a cluster included in the mobile object; and a controller configured to operate the display unit to display a scale and a pointer that indicate the scale based on the sensed driving state of the mobile object, and to detect a current driving state of the mobile object in real time to generate a control signal with respect to the display method including a brightness degree, a brightness region, and a color of the scale.

The information on the cluster may include information regarding acceleration and an engine Revolution Per Minute (RPM) of the mobile object. The controller may be configured to detect the acceleration of the mobile object, and estimate speed of the mobile object after a threshold time based on the acceleration to brightly display a range of the scale ranging to the estimated speed of the mobile object. The controller may be configured to gradually display brightness of the scale in a direction of a scale position that corresponds to the estimated speed from a scale that corresponds to current speed of the mobile object.

Further, the controller may be configured to enlarge a number (or character) that indicates current speed of the mobile object to display the enlarged number at a pointer position that indicates the current speed of the mobile object. The controller may be configured to operate the pointer to indicate a state of an engine RMP of the mobile object, and estimate variation of the engine RMP based on the speed of the mobile object and a sensed value of accelerator position. The controller may be configured to display (e.g., in bright or dark illumination) a range of the scale based on a pointer position based on the estimated variation of the engine RPM. The display unit may include a display device that includes a liquid crystal display (LCD).

In accordance with another aspect of the present invention, a method of displaying a cluster may include: detecting, by a controller, a driving state of a mobile object; displaying, by the controller, a pointer based on the detected driving state of the mobile object; and detecting, by the controller, a current driving state of the mobile object in real time, and changing, by the controller, a display method including a brightness degree, a brightness region, and a color of the scale to display the pointer and the scale.

The displaying of the pointer may include detecting cluster information that includes acceleration and an engine Revolution Per Minute (RPM) of the mobile object to display the pointer based on the determination result. The changing of the display method to display the pointer and the scale may include: detecting, by the controller, a current driving state of the mobile object in real time; estimating, by the controller, a state of the mobile object after a threshold time period; and gradually displaying, by the controller, brightness of the scale in a direction of a scale position that corresponds to the estimated state from a scale position in which the pointer is displayed.

In accordance with another aspect of the present invention, after the estimation of the state of the mobile object after a threshold time period, a method of displaying a cluster may further include displaying, by the controller, a particular region based on a scale position in which the pointer is displayed when variation of the state of the mobile object is not estimated.

BRIEF DESCRIPTION OF THE DRAWINGS

The objects, features and advantages of the present invention will be more apparent from the following detailed description in conjunction with the accompanying drawings, in which:

FIGS. 2A to 6 are exemplary diagrams illustrating a screen for a method for displaying a cluster according to an exemplary embodiment of the present invention.

DETAILED DESCRIPTION

Figure 1:
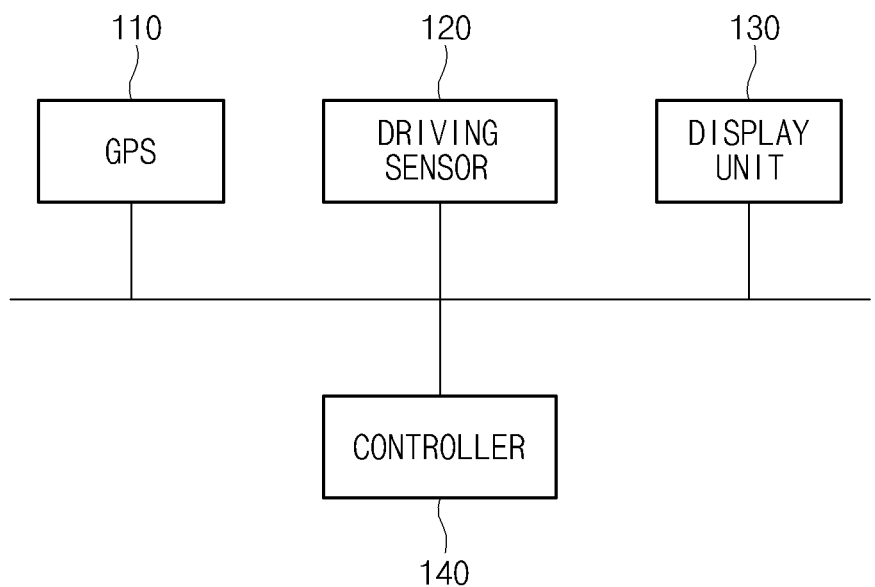
FIG. 1 is an exemplary block diagram illustrating a configuration of an apparatus for displaying a cluster according to an exemplary embodiment of the present invention.
Figure 2:
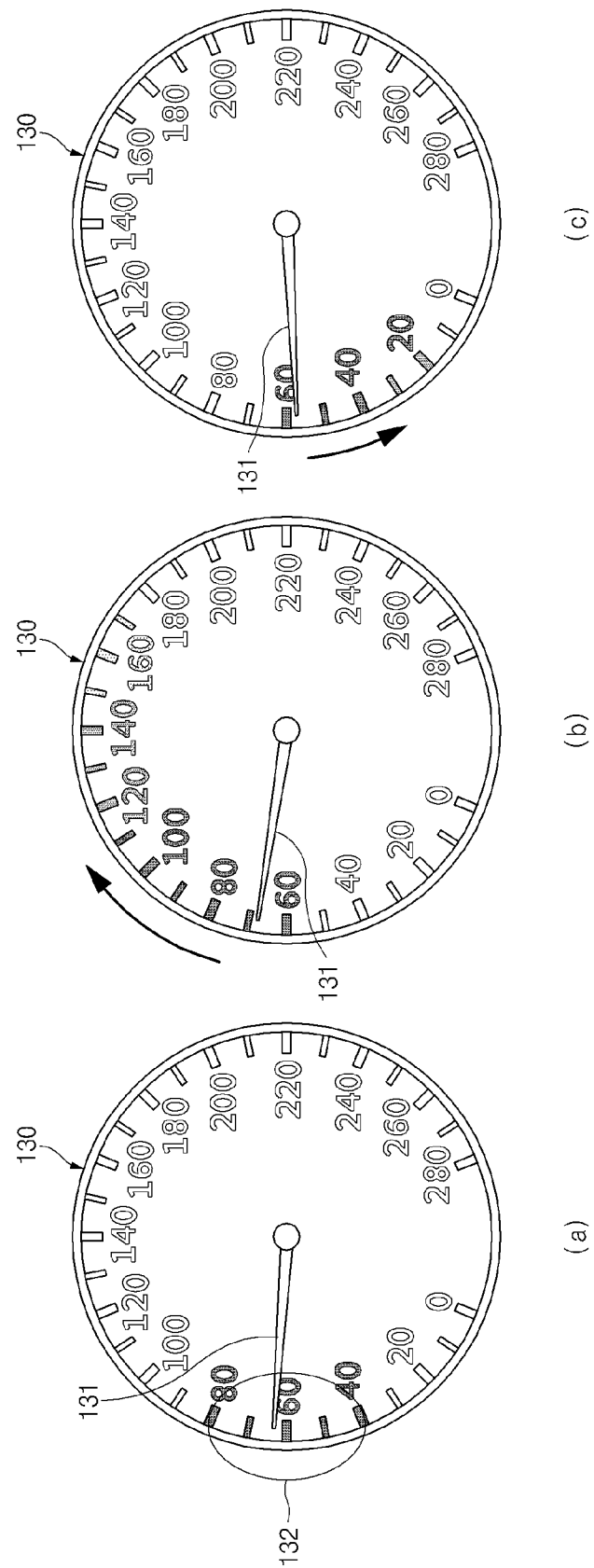
Figure 3:
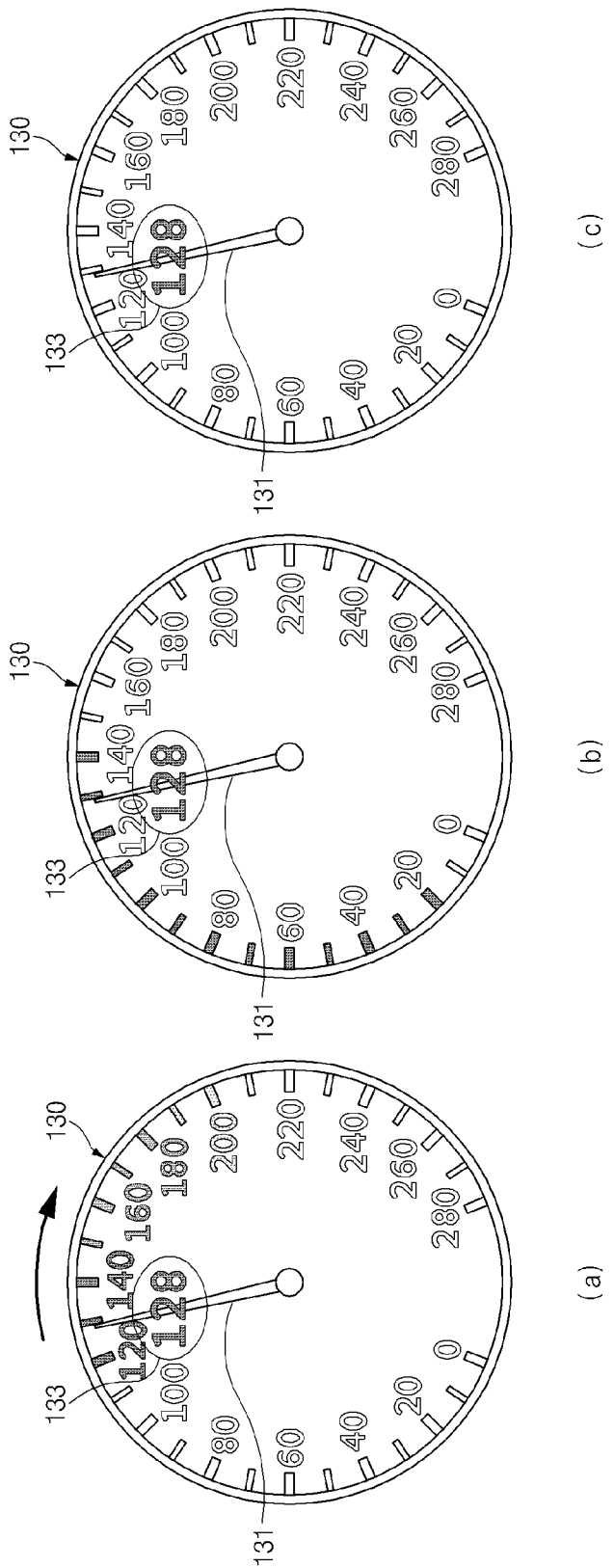
Figure 4:
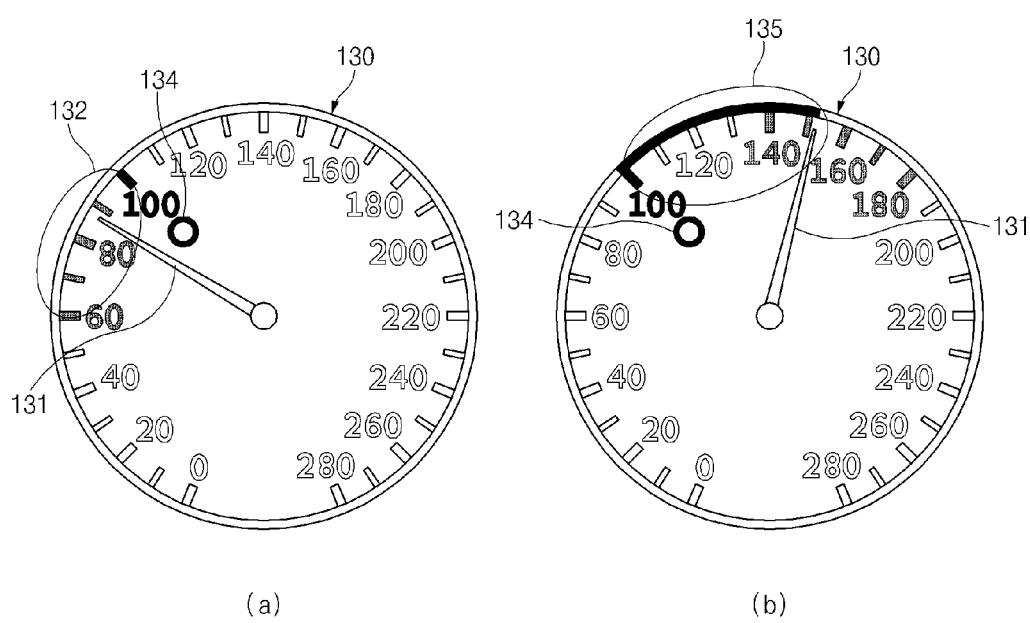
Figure 5:
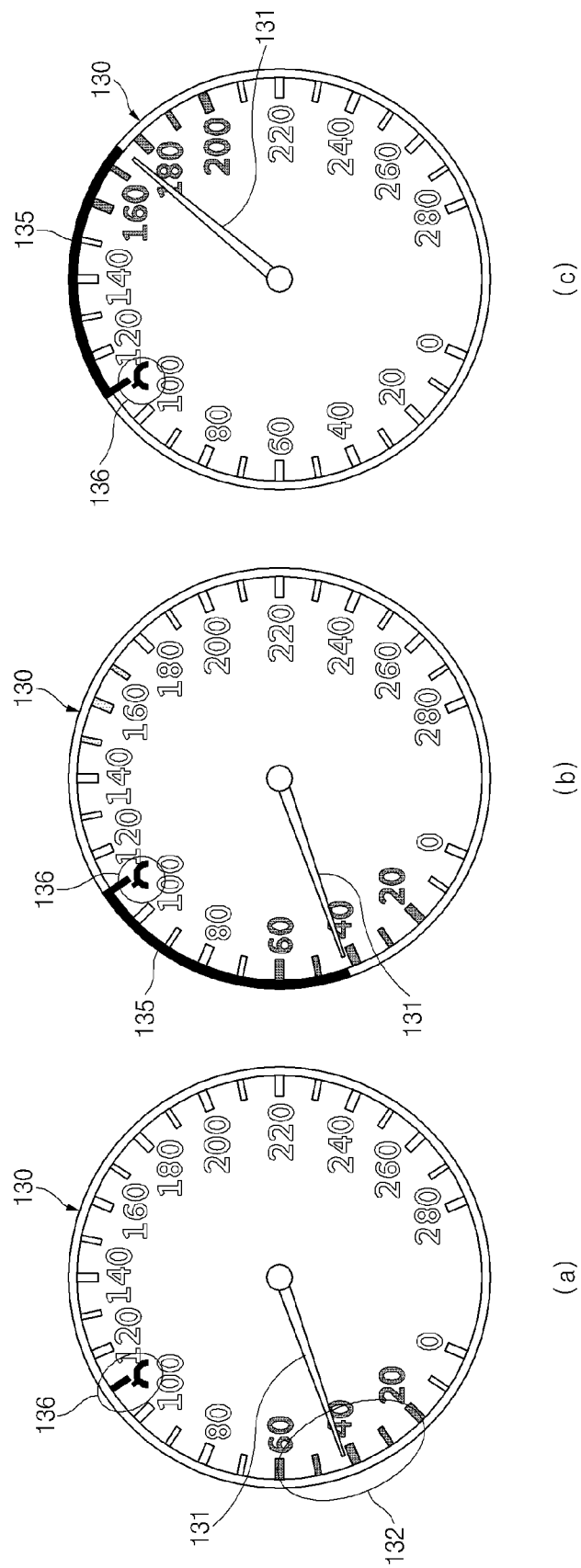

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

FIG. 1 is an exemplary block diagram illustrating a configuration of an apparatus for displaying a cluster according to an exemplary embodiment of the present invention. FIGS. 2A to 6 are exemplary diagrams illustrating a method for displaying a cluster according to an exemplary embodiment of the present invention. Referring to FIGS. 1 to 6, the cluster display apparatus 100 may include a GPS 110, a driving sensor 120, a display unit 130, and a controller 140.

The GPS 110 may be configured to detect a current location of the vehicle and provide the current location of the vehicle to the controller 140. The driving sensor 120 may be configured to sense a driving state of the vehicle to output sensing information. In particular, the driving sensor 120 may include a vehicle speed sensor configured to sense vehicle speed, an engine cooling water temperature sensor configured to sense a temperature of engine cooling water, a fuel sensor configured to sense a fuel amount, and an engine RPM sensor configured to sense revolutions per minute (RPM) of an engine. The sensor included in the driving sensor 120 is not limited to the above sensors, but various changes, variations and modifications can be made by those skilled in the art.

The display unit 130 may include a Liquid Crystal Display (LCD) and may be executed by the controller 140 to display information on the cluster. In particular, as shown in FIGS. 2A to 6, the display unit 130 may be configured to display a scale that indicates the information on the cluster as numeric values and a pointer that indicates the scale (e.g., the pointer points to the scale on the cluster). Further, the display unit 130 may be configured to change a light emitting color, light emitting brightness, and a light emitting range of the scale based on a driving state of the vehicle.

The controller 140 may be configured to operate the display unit 130 to display a scale that provides information on a cluster and a pointer that indicates the scale, and may be configured to generate a control signal of the display unit 130 based on a driving signal based on a driving state of the vehicle. FIGS. 2A to 6 illustrate a method for displaying a cluster according to an exemplary embodiment of the present invention.

The controller 140 may be configured to operate the display unit 130 to display current speed of the vehicle sensed from the driving sensor 120 as illustrated in FIG. 2A. In particular, the controller 140 may be configured to detect the driving state of the vehicle in real time to estimate a state of the vehicle after a threshold time period. In other words, the controller 140 may be configured to detect a push degree of a user on an accelerator to increase vehicle speed, and a push degree of the user on a brake to reduce the vehicle speed, to estimate a driving state of the vehicle after a threshold time period.

As an estimated result, in response to estimating that variation in the vehicle speed is less than a particular speed after the threshold time period, that is, when an acceleration of the vehicle is less than the particular speed, the controller 140 may be configured to operate the display unit 130 to cause a pointer 131 to indicate a current speed of for example, about 60 kph, and set a light emitting range 132 to be the range of for example, about 40 kph to 80 kph to brightly display the range of about 40 kph to 80 kph, which ranges from about −20 kph to +20 kph based on about 60 kph.

As the estimation result of the controller 140, in response to estimating that speed of the vehicle is increased after the threshold time period since pressure is applied to an accelerator (e.g., the accelerator is engaged), that is, when current acceleration of the vehicle is a particular speed or greater, the controller 140 may be configured to operate the display unit 130 to display as illustrated in FIG. 2B. The controller 140 may be configured to increase visibility of a driver to display more brightly from a number, for example, about 60 kph which is located directly under a location indicated by a pointer 131 to speed of the vehicle which is estimated to be changed after the threshold time period. In particular, the controller 140 may be configured to display, for example, about 60 kph, nearest to current vehicle speed at the scale, most brightly (e.g., at a highest brightness) and gradually decrease the illumination in a direction of the scale estimated as vehicle speed after the threshold time period when it is estimated that acceleration is increased. Accordingly, the driver may estimate the vehicle speed after the threshold time period from the light emitting range 132 displayed on the display unit 130.

Further, as the estimated result of the controller 140, in response to estimating that vehicle speed is reduced after the threshold time period since pressure is applied to brake (e.g., the brake pedal is engaged), that is, when current acceleration of the vehicle is a particular speed or greater in a reduced direction, the controller 140 may be configured to operate the display unit 130 to display as illustrated in FIG. 2C. The controller 140 may be configured to display, for example, about 60 kph, closest to the current vehicle speed at the scale, at a highest brightness and gradually reduce the illumination in a direction of the scale estimated as vehicle speed after the threshold time period in response to estimating that acceleration is reduced. Accordingly, the driver may estimate the vehicle speed after the threshold time period from the light emitting range 132 displayed on the display unit 130.

Additionally, the controller 140 may be configured to operate the display unit 130 to display current speed of the vehicle sensed from the driving sensor 120 as shown in FIG. 3A to 3C. The controller 140 may be configured to operate the display unit 130 to cause the pointer 131 to indicate the current speed, and operate to display (e.g., illuminate) a number that indicates the current speed on the same location as the pointer 131 as illustrated in reference numeral 133. In particular, the controller 140 may be configured to display or illuminate a part, closest to the pointer 131 that indicates current speed at a highest brightness (e.g., brighter than the other parts of the cluster) by setting a light emitting range with a specific region in an arrow direction as illustrated in FIG. 3A.

In addition, the controller 140 may be configured to operate the display unit 130 to emit light to mark the scale closest to corresponding vehicle speed, and adjust a pointer 131 and illuminate a number that indicates the current speed on the same location as the pointer 131 or operate the display unit 130 to not display speed of the vehicle as illustrated in FIG. 3C, but to illuminate a number 133 that indicates the current speed together with the pointer 131. Accordingly, the driver may maintain a forward gaze to maintain safe driving.

The controller 140 may be configured to detect a current location of the vehicle received from the GPS 110, and detect limited speed (e.g., a speed limit) set on a road that corresponds to the detected current location. The controller 140 may be configured to display the speed limit on the display unit 130 as illustrated in reference numeral 134 of FIGS. 4A and 4B. In particular, the controller 140 may be configured to operate the display unit 130 to display the speed limit as illustrated in reference numeral 134 and to change and display a color of a number that corresponds to the speed limit on the scale. Further, the controller 140 may be configured to set and display (e.g., illuminate) a predetermined range as the light emitting range 132 based on current vehicle speed detected from the driving sensor 120 as illustrated in reference numeral 132. Further, when the vehicle speed exceeds the speed limit, the controller 140 may be configured to output a warning to the driver by displaying a circular arc at an edge of the scale as illustrated in reference numeral 135 of FIG. 4B.

Moreover, the controller 140 may be configured to provide a cruise control function which is a constant speed driving function to uniformly maintain the speed of the vehicle. When cruise control is set by the driver, the controller 140 may be configured to operate the display unit 130 to display (e.g., illuminate) the speed limit set by the driver as illustrated in reference numeral 136 of FIGS. 5A to 5C.

When the vehicle is in a resume state that restarts a cruise control function after adjusting the driving vehicle speed in a state in which the cruise control is set, the controller 140 may be configured to display the limited speed set by the driver as illustrated in FIG. 5B on the display unit 130 as reference numeral 136 and operate the display unit 130 to cause the pointer 131 to indicate the current vehicle speed. Further, the controller 140 may be configured to display a circular arc from the current speed to the speed limit at an edge of the scale as illustrated in reference numeral 135.

Figure 6:
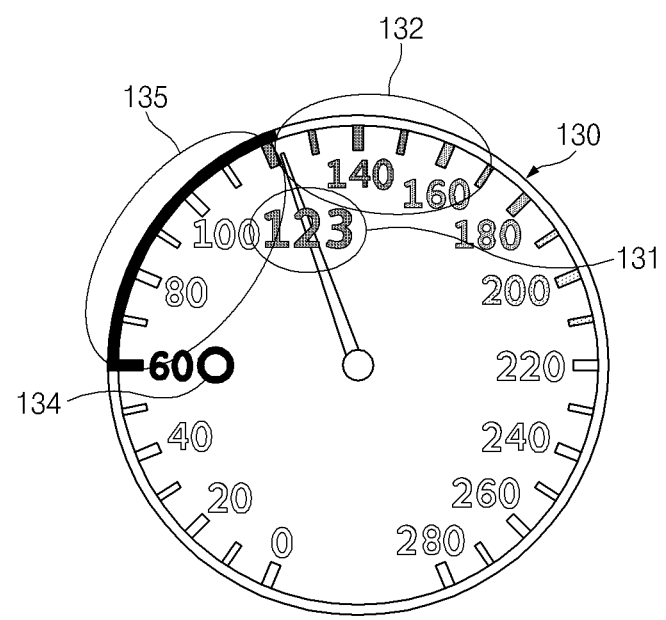

In addition, when the cruise control function applied to the vehicle is an adaptive cruise control function, the controller 140 may be configured to provide an override mode in which a cruise control function may be released by an input of the driver or the cruise control function may be released by engaging the accelerator or a brake pedal. The controller 140 may be configured to display the speed limit set by the driver on the display unit 130 as illustrated in reference numeral 136 of FIG. 5C. The controller 140 may be configured to display the current vehicle speed sensed from the driving sensor 120 using the pointer 131 in the override mode, and display (e.g., illuminate) a circular arc starting from the speed limit before the cruise control function is released to the current speed as illustrated in reference 135. Furthermore, the controller 140 may be configured to simultaneously display functions illustrated in FIGS. 2 to 5 as shown in FIG. 6.

In addition, the foregoing embodiment has illustrated that the controller 140 may be configured to estimate and display the vehicle speed on the display unit 130, and estimate and display the vehicle speed after a threshold time period when the vehicle is driven for the threshold time period in a current driving state. The controller 140 may be configured to operate the display unit 130 to estimate variation of a tachometer, that is, variation of engine RPM of the vehicle.

For an automatic vehicle, since a speed may be changed according to the vehicle speed and an Accelerator Position Sensor (APS) value, the engine RMP may be estimated. Although not shown, the controller 140 may be configured to operate the display unit 130 to cause a pointer to indicate current engine RMP of the vehicle, and estimate variation in the engine RMP based on the vehicle speed and the vehicle APS value. The controller 140 may be configured to operate the display unit 130 to display (e.g., illuminate) a range of the scale at a different brightness based on a position of the pointer and the estimated variation in the engine RMP. For example, when the vehicle is driven at about 40 kph in fourth gear about 1500 rpm, in response to detecting that the RPM is intended to be changed into second gear about 4500 rpm after the APS is changed from about 10% to 100%, the controller 140 may be configured to adjust a pointer to be located at about 1500 rpm of the scale, and illuminate a region of the scale from about 1500 rpm to 4500 rpm on the display unit 130. Accordingly, the driver may determine a target engine RMP of the vehicle.

Accordingly, the apparatus for displaying a cluster according to the present invention enables the driver to detect a driving state of the vehicle by displaying driving information of the vehicle by configuring the display unit 130 with a display device such as an LCD. Further, it is illustrated that an apparatus for displaying a cluster of the exemplary embodiment of the present invention may be mounted within the vehicle, but the exemplary embodiment is not limited thereto, but it is obvious that the present invention is applicable to a mobile object such as an air plane and a train.

Figure 7:
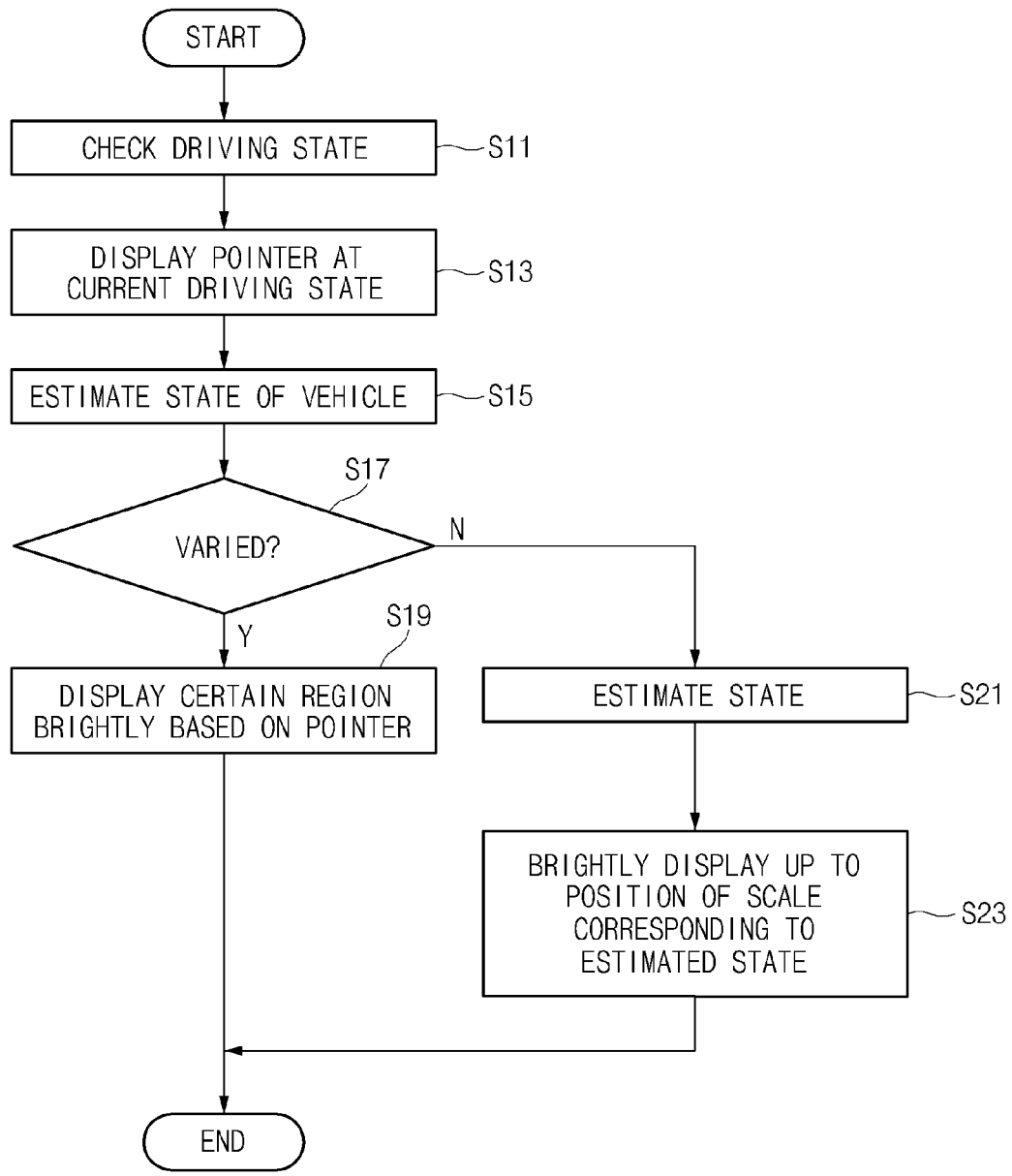
FIG. 7 is an exemplary flowchart illustrating a method for displaying a cluster according to an exemplary embodiment of the present invention.

FIG. 7 is an exemplary flowchart illustrating a method for displaying a cluster according to an exemplary embodiment of the present invention. Referring to FIGS. 1 and 7, a controller 140 may be configured to detect a driving state of the vehicle (e.g., speed of the vehicle, temperature of engine cooling water, fuel amount, RMP of an engine, and the like) at step S11. The controller 140 may be configured to operate the display unit 130 to adjust a pointer position to a location that indicates a current driving state of the vehicle at step S13.

Further, the controller 140 may be configured to detect a state of the vehicle in real time to estimate a state of the vehicle after a threshold time period at step S15. In response to estimating that the state of the vehicle shall be varied at step S17, the process may proceed to step S21. In response to estimating that the state of the vehicle shall not be varied, the process may proceed to step S19. The controller 140 may be configured to illuminate a particular region based on the pointer displayed at step S13 at step S19. Additionally, in response to estimating that the state of the vehicle shall be varied at S17, the controller 140 may be configured to estimate a state of the vehicle which shall be varied at step S21, and the process may proceed to step S23.

The controller 140 may be configured to illuminate from a position of a scale in which a pointer that indicates a current state is displayed to a position of a scale that corresponds to a state estimated at step S21, at step S23. In addition, brightness of the scale may be gradually decreased toward the position of the scale that corresponds to the estimated state based on the scale in which the pointer is displayed.

As described above, the present invention may improve visibility and convenience of the driver by changing the illumination color, the illumination brightness, and the illumination range with respect to the meter that provides the information on the cluster disposed within the vehicle and a pointer that indicates a scale of the meter based on a driving state of the vehicle.

What is claimed is:

1. An apparatus for displaying a cluster, the apparatus comprising:
    a driving sensor configured to sense a driving state of a mobile object;
    a display unit configured to convert a method of displaying a cluster disposed within the mobile object; and
    a controller configured to:
       display a scale and a pointer that indicates the scale based on the sensed driving state of the mobile object; and
       detect a current driving state of the mobile object in real time to generate a control signal with respect to the display method including a brightness degree, a brightness region, and a color of the scale,
    wherein the controller is further configured to:
       detect the acceleration of the mobile object; and
       estimate a speed of the mobile object after a threshold time period based on the acceleration to illuminate a range of the scale ranging to the estimated speed of the mobile object.

2. The apparatus of claim 1, wherein information displayed on the cluster comprises information regarding an acceleration and an engine Revolution Per Minute (RPM) of the mobile object.

3. The apparatus of claim 2, wherein the controller is configured to:
    adjust the pointer to indicate a state of an engine RMP of the mobile object; and
    estimate variation of the engine RMP based on the speed of the mobile object and a sensed value of an accelerator position.

4. The apparatus of claim 3, wherein the controller is configured to:
    illuminate a range of the scale based on a position of the pointer based on the estimated variation of the engine RPM.

5. The apparatus of claim 1, wherein the controller is configured to:
    gradually decrease an illumination brightness of the scale in a direction of a scale position that corresponds to the estimated speed from a scale position that corresponds to a current speed of the mobile object.

6. The apparatus of claim 1, wherein the controller is configured to:
    enlarge a number that indicates a current speed of the mobile object to display the enlarged number at a pointer position that indicates the current speed of the mobile object.

7. The apparatus of claim 1, wherein the display unit includes a display device that has a liquid crystal display (LCD).

8. A method of displaying a cluster, the method comprising:
    detecting, by a controller, a driving state of a mobile object;
    displaying, by the controller, a pointer based on the detected driving state of the mobile object;
    detecting, by the controller, a current driving state of the mobile object in real time; and
    changing, by the controller, a display method including a brightness degree, a brightness region, and a color of the scale to display the pointer and the scale on a display unit,
    wherein the changing of the display method to display the point and the scale includes:
       detecting by the controller, a current driving state of the mobile object in real time;
       estimating, by the controller, a state of the mobile object after a threshold time period; and
       gradually decreasing, by the controller, illumination brightness of the scale in a direction of a scale position that corresponds to the estimated state from a scale position at which the pointer is displayed.

9. The method of claim 8, wherein displaying the pointer includes:
    detecting, by the controller, cluster information that includes an acceleration and an engine Revolution Per Minute (RPM) of the mobile object to display the pointer based on the detected result.

10. The non-transitory computer readable medium of claim 9, wherein displaying the pointer further comprises:
    program instructions that detect cluster information that includes an acceleration and an engine Revolution Per Minute (RPM) of the mobile object to display the pointer based on the detected result.

11. The method of claim 8, after estimating the state of the mobile object after the threshold time period, further comprising:
    illuminating, by the controller, a particular region based on a scale position at which the pointer is displayed when variation of the state of the mobile object is not estimated.

12. The method of claim 8, wherein the display unit includes a display device that has a liquid crystal display (LCD).

13. A non-transitory computer readable medium containing program instructions executed by a controller, the computer readable medium comprising:
    program instructions that detect a driving state of a mobile object;

program instructions that display a pointer based on the detected driving state of the mobile object;

program instructions that detect a current driving state of the mobile object in real time; and program instructions that change a display method including a brightness degree, a brightness region, and a color of the scale to display the pointer and the scale on a display unit, wherein changing of the display method to display the point and the scale further comprises;

program instructions that detect a current driving state of the mobile object in real time;

program instructions that estimate a state of the mobile object after a threshold time period; and program instruction that gradually decrease illumination brightness of the scale in a direction of scale position that corresponds to the estimated state from a scale position at which the pointer is displayed.

14. The non-transitory computer readable medium of claim 13, wherein after estimating the state of the mobile object after the threshold time period further comprises:

program instructions that illuminate a particular region based on a scale position at which the pointer is displayed when variation of the state of the mobile object is not estimated.

15. The non-transitory computer readable medium of claim 13, wherein the display unit includes a display device that has a liquid crystal display (LCD).

* * * * *